US012682019B2

(12) United States Patent
Broadhead

(10) Patent No.: US 12,682,019 B2
(45) Date of Patent: Jul. 14, 2026

(54) SECURE AGGREGATION OF MULTIPLE NETWORK INCOGNIZANT LICENSING SERVICES INTO A SINGLE SERVICE FOR THE PURPOSE OF SCALING AND REDUNDANCY

(71) Applicant: CIENA CORPORATION, Hanover, MD (US)

(72) Inventor: Robin Broadhead, Kanata (CA)

(73) Assignee: CIENA CORPORATION, Hanover, MD (US)

( * ) Notice: Subject to any disclaimer, the term of this patent is extended or adjusted under 35 U.S.C. 154(b) by 149 days.

(21) Appl. No.: 18/349,265

(22) Filed: Jul. 10, 2023

(65) Prior Publication Data

US 2025/0021627 A1     Jan. 16, 2025

(51) Int. Cl.
    *G06F 21/10*          (2013.01)
(52) U.S. Cl.
    CPC .................................. *G06F 21/105* (2013.01)
(58) Field of Classification Search
    None
    See application file for complete search history.

(56) References Cited

U.S. PATENT DOCUMENTS

| | | | | | |
|---|---|---|---|---|---|
| 7,565,325 | B2 * | 7/2009 | Lenard | .................. | G06F 21/105 |
| | | | | | 726/1 |
| 7,603,318 | B1 * | 10/2009 | Colosso | .................. | G06F 21/10 |
| | | | | | 705/51 |

| | | | | | |
|---|---|---|---|---|---|
| 8,041,642 | B2 * | 10/2011 | Lenard | .................. | G06F 21/105 |
| | | | | | 705/902 |
| 10,701,141 | B2 * | 6/2020 | Salapura | ............ | G06F 9/45558 |
| 11,411,833 | B1 * | 8/2022 | Subramanian | ...... | H04L 41/0894 |
| 11,507,356 | B2 * | 11/2022 | Maturi | .................... | H04L 67/34 |
| 2004/0039916 | A1 * | 2/2004 | Aldis | .................... | G06F 21/105 |
| | | | | | 713/177 |
| 2007/0214030 | A1 * | 9/2007 | Shear | .................... | G06Q 30/00 |
| | | | | | 705/345 |

(Continued)

FOREIGN PATENT DOCUMENTS

| | | | | | |
|---|---|---|---|---|---|
| EP | 3200111 | A1 * | 8/2017 | .......... | G06F 21/105 |
| WO | WO-02101523 | A2 * | 12/2002 | ............. | G06F 17/00 |

OTHER PUBLICATIONS

"Entitlement Management", https://www.revenera.com/software-monetization/products/entitlement-management, 7 Pages.

(Continued)

*Primary Examiner* — Neha Patel
*Assistant Examiner* — Jahed Ali
(74) *Attorney, Agent, or Firm* — Guntin & Gust, PLC; John G. Rauch

(57)          ABSTRACT

Aspects of the subject disclosure may include, for example, receiving at a license distribution system, information about a pool of license entitlements for deployment to network elements in a network to enable operational features of the network elements, receiving a deployment plan for distributing license entitlements of the pool of license entitlements to the network elements, and deploying required license entitlements to network elements of according to the deployment plan to control distribution of the required license entitlements to the network elements in the network. Other embodiments are disclosed.

20 Claims, 5 Drawing Sheets

(56) References Cited

U.S. PATENT DOCUMENTS

| | | | |
|---|---|---|---|
| 2012/0059700 A1* | 3/2012 | Darbyshire | G06Q 30/0214 |
| | | | 726/28 |
| 2012/0173709 A1* | 7/2012 | Li | G06F 9/5011 |
| | | | 709/224 |
| 2014/0136426 A1* | 5/2014 | Koka | G06Q 10/00 |
| | | | 705/310 |
| 2015/0142747 A1* | 5/2015 | Zou | G06F 11/1464 |
| | | | 707/649 |
| 2017/0041346 A1* | 2/2017 | Shvarts | H04L 63/08 |
| 2017/0357784 A1* | 12/2017 | Duda | G06F 21/105 |
| 2018/0007127 A1* | 1/2018 | Salapura | H04L 47/783 |
| 2019/0102849 A1* | 4/2019 | Bertot | G06F 16/27 |
| 2019/0213004 A1* | 7/2019 | Zhu | H04L 67/34 |
| 2021/0200838 A1* | 7/2021 | Dargar | G06F 21/105 |
| 2022/0043642 A1* | 2/2022 | Maturi | G06F 8/60 |
| 2022/0377615 A1* | 11/2022 | Radunovic | G06F 11/3428 |
| 2024/0248694 A1* | 7/2024 | Dzhigarov | G06F 8/61 |
| 2024/0340255 A1* | 10/2024 | Raikov | G06F 9/5072 |
| 2025/0021627 A1* | 1/2025 | Broadhead | G06F 21/105 |

OTHER PUBLICATIONS

"FlexNet Operations", revenera, 6 Pages.
"Software Licensing", https://www.revenera.com/software-monetization/products/software-licensing, 6 Pages.
"International Search Report of PCT/US2024/035389", 13 Pages.
International Preliminary Report on Patentability for PCT/US2024/035389, issued Jan. 22, 2026.

* cited by examiner

200

300

400

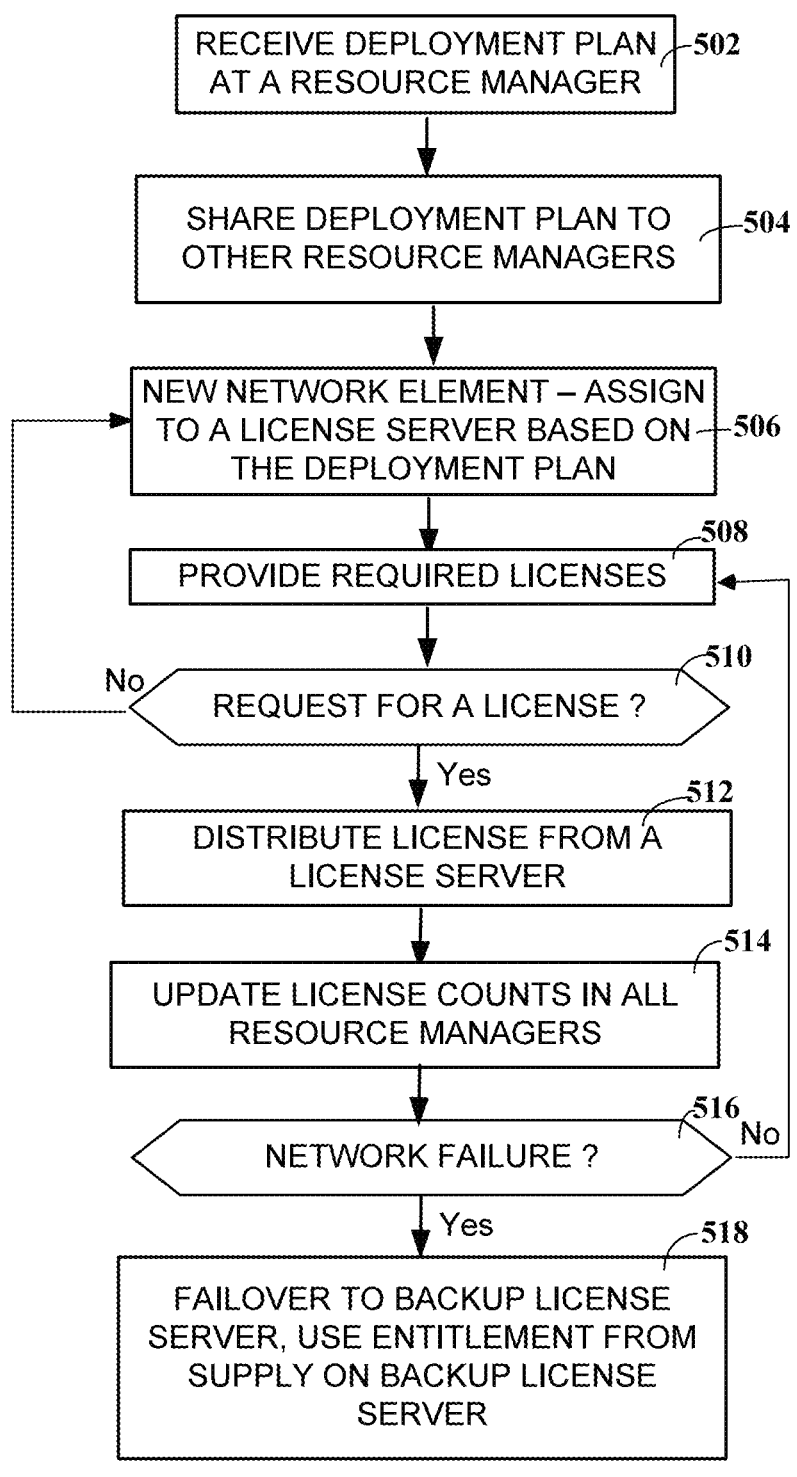

RECEIVE DEPLOYMENT PLAN AT A RESOURCE MANAGER ─502

SHARE DEPLOYMENT PLAN TO OTHER RESOURCE MANAGERS ─504

NEW NETWORK ELEMENT – ASSIGN TO A LICENSE SERVER BASED ON THE DEPLOYMENT PLAN ─506

PROVIDE REQUIRED LICENSES ─508

REQUEST FOR A LICENSE ? ─510

No

Yes

DISTRIBUTE LICENSE FROM A LICENSE SERVER ─512

UPDATE LICENSE COUNTS IN ALL RESOURCE MANAGERS ─514

NETWORK FAILURE ? ─516    No

Yes

FAILOVER TO BACKUP LICENSE SERVER, USE ENTITLEMENT FROM SUPPLY ON BACKUP LICENSE SERVER ─518

SECURE AGGREGATION OF MULTIPLE NETWORK INCOGNIZANT LICENSING SERVICES INTO A SINGLE SERVICE FOR THE PURPOSE OF SCALING AND REDUNDANCY

FIELD OF THE DISCLOSURE

This disclosure relates generally to apparatus and procedures for licensing services for computer software and other resources.

BACKGROUND

Products and services such as software, applications and product features may be licensed by a licensor for access and use by customers. The licensing process should scale to accommodate a customer's growth and need for additional licenses or entitlements from the licensor.

BRIEF DESCRIPTION OF THE DRAWINGS

Reference will now be made to the accompanying drawings, which are not necessarily drawn to scale, and wherein:

FIG. 5 depicts an illustrative embodiment of a method in accordance with various aspects described herein.

DETAILED DESCRIPTION

The subject disclosure describes, among other things, illustrative embodiments for implementing a licensing distribution system according to a predefined license deployment plan that enables a network operator or other customer to scale from one to many their license servers without having to micromanage the entitlements on each additional license server. Furthermore, the deployment plan can provide inherent high availability and the automatic distribution of additional licenses or entitlements. A customer can implement, control, distribute and scale their license servers themselves without dealing with the current administrative difficulties. Such difficulties includes accessing the vendor's website to add new license servers, moving licenses around and then generating and downloading the new licenses for each license server, every time the customer needs to make a change. Other embodiments are described in the subject disclosure.

One or more aspects of the subject disclosure include receiving at a license distribution system, information about a pool of license entitlements for deployment to one or more license servers of a plurality of license servers, receiving a deployment plan for distributing license entitlements of the pool of license entitlements, and allocating required license entitlements amongst a plurality of license servers to control allocation of the required license entitlements to network elements in a network.

One or more aspects of the subject disclosure include receiving, by a processing system including a processor at a license distribution system, information about a pool of license entitlements for deployment, receiving, by the processing system, a deployment plan for distributing license entitlements of the pool of license entitlements among license servers of a cluster of license servers, and allocating, by the processing system, required license entitlements to the plurality of license servers in response to requests from network elements in the network.

One or more aspects of the subject disclosure include a license server which may include a processing system including a processor and a memory that stores executable instructions that, when executed by the processing system, facilitate performance of operations. In embodiments, the operations may include receiving at a license distribution system, information about a pool of license entitlements for deployment to one or more license servers of a plurality of license servers, receiving a deployment plan for distributing license entitlements of the pool of license entitlements, and deploying required license entitlements to the plurality of license servers according to the deployment plan to control distribution of the required license entitlements to network elements in network.

Figure 1:
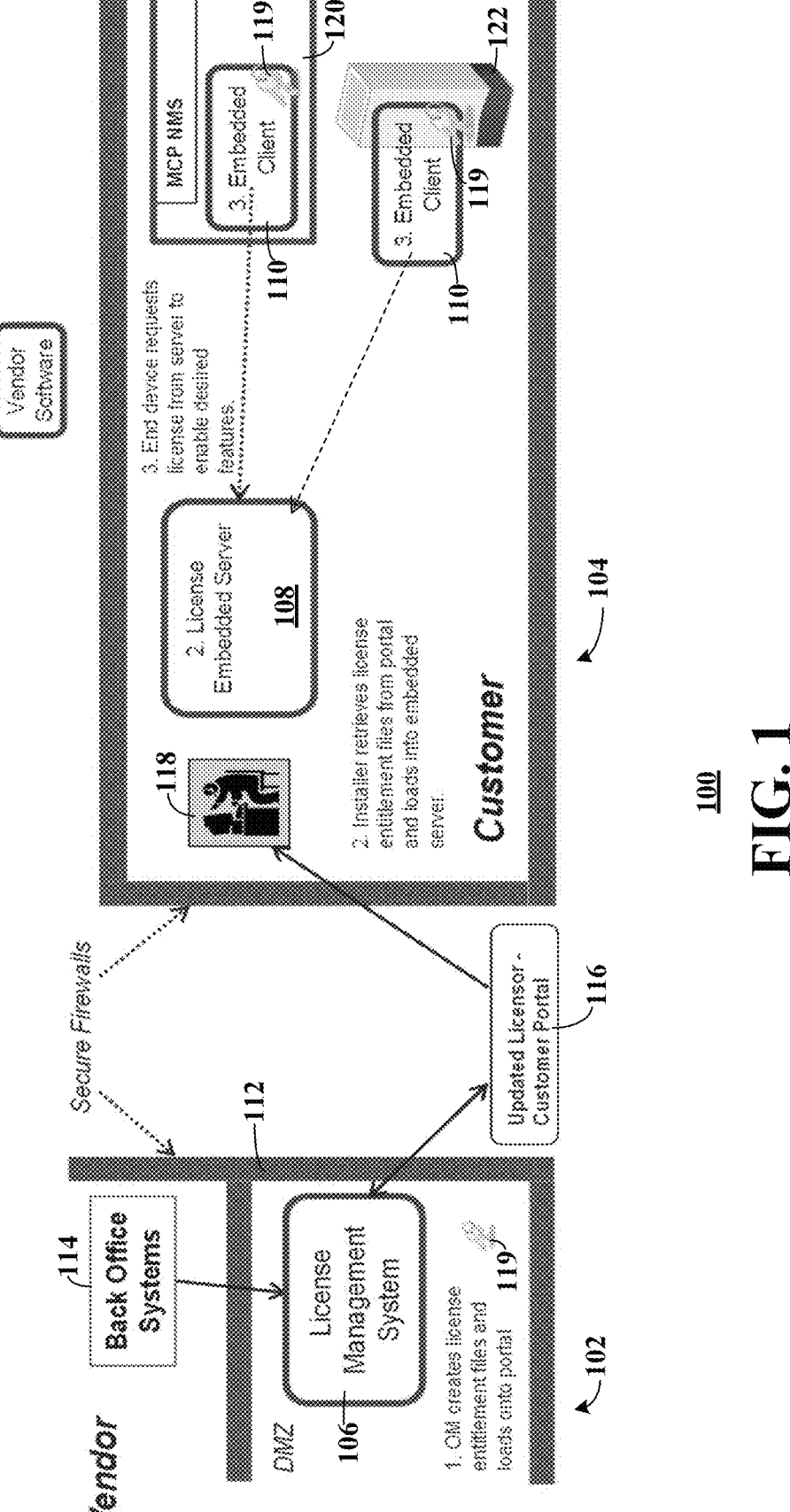
FIG. 1 is a block diagram illustrating an exemplary, non-limiting embodiment of a communications network in accordance with various aspects described herein.

FIG. 1 is a block diagram illustrating an example, non-limiting embodiment of a licensing management system 100. For example, the licensing management system 100 can facilitate in whole or in part managing licenses for computer software, applications, communications devices and other products and services in accordance with various aspects described herein.

Many enterprises maintain a licensing operation to provide authorization to use certain defined intellectual property of the enterprise. A license sets out the terms of usage by the licensee and compensation to the licensor. In many instances, a license may be granted by a vendor as part of a sale of a product to a customer. For example, a communications component such as a switch or router for installation by the customer in a communications network of the customer may include software and hardware elements or functional features covered by copyright protection, patent protection, contract terms and other forms of legal rights. To ensure ready access to such protected rights, the customer acquires a license and therefore an entitlement to use the protected rights. The license may be granted by the vendor as part of a sale or lease of equipment or software and may be provided at a cost payable by the customer to the vendor. Some customers obtain many hundreds or thousands of such licenses from a vendor. A collection of licenses is comparable to a simple bill of materials. Each license contains a single feature name and associated count represented as a prime number. Each individual count is an entitlement of that feature which can be reserved to enable some licensed controlled capability.

A licensing program offers substantial convenience and business advantages. For the vendor, the licensing program enables packaging and selling software to better capture return on investment in software development efforts by the vendor. Further, for the vendor, individual licenses may be tied to features of hardware or software that may be activated or deactivated for each customer or for each product installation. Features the customer is entitled to use may be covered by one or more entitlements of a license. For the customer, such access enables the parties to keep a transaction simple for the customer by providing one process for all products of the vendor. The parties together may seek to avoid network impacts and simplify use of products of the vendor by the customer. The vendor has an incentive to prevent accidental unpaid access to software and product features by customers and others. The customer may desire a licensing arrangement that is easily expandable to accommodate growth of customer networks. Goals of the licensing program for both parties include simplification to remove any barriers to use of the vendor's products and services.

The licensing process may operate for the convenience of the vendor and the customer. As the vendor installs equipment, a licensing system of the customer may contact a license management system to obtain the necessary entitlements.

Conventional license server capabilities allow for only single servers to support license distribution of a customer's entitlements to specific license servers. Significantly, conventional systems do not provide for Geographic Redundancy (GR) and only provide a one-to-one High Availability (HA) standby in the event of temporary service failure. Further, in the conventional system, each server must be managed independently such as a vendor-hosted central service. This conventional setup is very time consuming to manage for customers having a very large network of devices to license. Such a conventional setup complicates management and scaling beyond the resource capabilities of an individual server or predefined set of servers. Such a conventional setup also requires the customer to return to the vendor hosted service and create new licenses. This will often require the customer to make changes to their network element device (NE) configurations whenever the customer needs to scale or even add licenses.

Further, data traffic for a large licensing program may be substantial. In one example, a vendor of communications equipment provides licensing for approximately twenty products to a large number of customers. The vendor needs to process 20-100 license inquiries per second. Each customer device enquires about a license once per day to verify and renew the license and identify any changes to the terms of the license. A response packet returned by the licensing system in response to the inquiry generally includes 10-50 kB. However, the vendor has 80,000 to 100,000 devices installed which creates a substantial data load which may even exceed the capacity of a single license server.

To address these limitations imposed by conventional systems, an improved licensing solution in accordance with some aspects described herein includes resource managers on a vendor's network configured together and each securely paired with a respective license server. This solution allows for the deployment of a customer-controller fully scalable cluster, instead of the existing limited, dedicated server solution. This arrangement provides several advantages. First, this arrangement enables customer-controlled server scaling so that, as licensing requirements and customer needs grow, the licensing function of a vendor can grow. Further, this arrangement enables geographic redundancy to provide improved performance and reduced latency. Still further, this arrangement enables dynamic sharing of licenses among a customer's license servers. Still further, this arrangement requires only minimal user interaction and then, only on the cluster as a single entity.

In an example embodiment, a typical licensing service which was not capable of geographic redundancy or load sharing by itself, can now be added to a cluster of license servers. Then, the whole cluster can be managed as one entity using unique certificates and a combination of allow/ deny lists for resource allocation and entitlement control. This arrangement provides the customer with all the capabilities and advantages of geographic redundancy and high availability with-out the need to micro-manage every license server from the vendor hosted central service. Furthermore, the arrangement can be achieved in an airgap or isolated network because all the necessary configuration information is contained within the cluster. Without this solution, meticulous control, planning, and oversight is required for each server every time a licensing or network configuration change is required.

The licensing service uses a set of resource managers co-resident with the license servers, arranged in a token ring, to manage the configuration files of each of the license servers to securely allocate clients and licensing resources for each license server. The resource managers communicate together over a secured token ring network. The maintenance of the configuration files are all secured from tampering with encryption and digital certificates, and the resource managers actively manage the protected configuration of each service in real time. This ensures that the distribution of entitlements or licenses is fully secured.

Referring now to FIG. 1, in an embodiment, the licensing management system 100 illustrates a typical interaction between a vendor 102 and a customer 104. In general, the customer 104 is one customer of many customers of the vendor 102. The customer 104 purchases from the vendor 102 goods or services, or a combination of these, for use in the business of the customer 104. In an example, the goods include communications equipment such as telecommunications switches, servers, and related equipment. In addition to hardware, the customer 104 also acquires software to control the operation of the equipment. Further, the customer may select certain operational features of the equipment to be selectively enabled or disabled, such as communication bandwidth, communication frequencies, memory size, and other features. Such selectable features allow the customer to tailor the customer's hardware to the customer's particular requirements. Further, such selectable features allow the customer to vary the selected features over time as customer requirements change.

Such an acquisition by the customer of hardware and software may be under terms of a purchase agreement. The purchase agreement may be negotiated by the customer 104 and a sales operation of the vendor 102. The purchase agreement sets out commercial terms including payment terms, warranties, provision for software updates and so forth. Such terms are agreed to by the parties in recognition of an on-going relationship between vendor 102 and customer 104.

Further, the acquisition of hardware and software may include one or more associated licenses. The vendor 102 has exclusive rights in certain aspects of the hardware and software. Such rights include patent rights, copyright rights and others. To enable the customer 104 to make use of the software and hardware, the licenses provide an entitlement to use specific capabilities or features license by the vendor 102 for use by the customer 104.

In the embodiment of FIG. 1, a license management system 106 is associated with the vendor 102, a license embedded server 108 is associated with the customer 104 and one or more clients 110. The license management system 106 in this example is located behind a secure firewall 112 of the vendor 102. The secure firewall 112 controls access to data and other information from outside the vendor. Any suitable combination of hardware and software may be used to form the secure firewall 112.

The license management system 106 cooperates with the back-office systems 114 of the vendor 102 to prepare and provide licenses or entitlements to customers such as the customer 104. The back-office systems 114 may include any combination of operations management (OM) functions. In particular, the back-office systems 114 may include functions to create and distribute licensing information related to products and services of the vendor 102. Such functions include tracking and managing compliance with licensing requirements, measuring usage, creating product configurations and changing features according to customer requests and requirements.

The back-office systems 114 may be used to select and arrange licenses or entitlements for customers such as the customer 104, for example in response to purchase requirements of the customer 104 provided to sales personnel of the vendor 102. The back-office systems then generate a physical license file exclusively for the customer 104.

Licensing information may cover the widest range of features and devices associated with products and services of the vendor 102 that may be required by a customer 104. A license, also referred to herein as an entitlement, provided by the vendor may define and control the aspects of operation of a network element or device. The device, as installed in the system of the customer 104 may communicate daily or at other times to confirm the current license terms and adjust its performance accordingly. The customer 104 may, for example, buy additional capacity by licensing additional bandwidth for the device, and paying a suitable licensing fee, in response to increased demand on the customer's network.

In an example, the back-office systems 114 of the vendor 102 create license files and load the license files onto a portal 116 formed by the license management system 106. The license file in an example includes a complete image of all the licenses that should appear on the license embedded server 108 of the customer 104 for distribution to clients 110. The license file may be associated with, for example, a request for registration and entitlement received by the vendor 102 from the customer 104.

The license embedded server 108 in embodiments includes a plurality of individual license servers. Each respective license server operates to receive a request for licenses or entitlements from network elements such as a communications switch 122. The license server distributes requested licenses to network elements according to information contained in the license file.

In this manner, using the license file, license servers such as the license embedded server 108 may operate as a proxy for a centralized server. With the information contained in the license file, the license embedded server 108 provides all functions for a back-end license system. The license embedded server 108, in conjunction with the license file, enables sharing of licenses among devices of the customer 104, as indicated by the arrows between the license embedded server 108 and the embedded clients 110. When the embedded clients 110 require a license, they request the needed licenses from the license embedded server 108. The license embedded server 108 normally already has the licenses, by way of the license file, and provides the licenses as required. If the embedded license server 108 has no more licenses of the type requested, the license embedded server 108 rejects the request.

Customers such as the customer 104 may access the license entitlement files by accessing the vendor's portal 116. The customer 104 may copy the license file and store the copy on, for example, the license embedded server 108.

In embodiments, the license management system 106 is a secure infrastructure component of the vendor 102 that operates to, among other functions, generate encrypted keys 119 for use by customers such as customer 104 requiring licenses for use with products and services of the vendor 102.

The license embedded server 108 is associated with the customer 104 and may be located on premises of the customer 104 or within a customer's private network. The license embedded server 108 receives the license file from the license management system 106 of the vendor and maintains a pool of licenses for use by clients 110 of the customer 104. The installer 118 may interface with the portal 116 of the vendor 102 to acquire a new license file or an updated license file. The installer 118 requests and retrieves the new entitlement information from the portal 116 and it's loaded onto the license server 108.

The vendor 102 provides the license embedded server 108 to the customer 104. For example, the vendor 102 may prepare an installation package such as a Linux RPM package for delivery as an autonomous entity to the customer 104. The package may be delivered through the licensor-customer portal 116.

The license file provided to the license embedded server 108 may include any suitable information defining a licensed product, service, feature, characteristic, and so on, which may be applicable to a product of the vendor 102 used by the customer 104. The license file may include keys 119 or other information for managing security and access to the contents of the license file. The license embedded server 108 stores license information based on the license file received by the installer 118.

The customer 104 may utilize any number of products of the vendor 102. In the example, the customer 104 includes a network management, control and planning system (MCP NMS) 120 and a communications switch 122. Any number of products may be instantiated by the customer and the respective products may be termed network elements (NE or NEs).

Associated with each of the NEs, including the MCP NMS 120 and the communications switch 122, is an embedded client 110. The clients 110 cooperate with the license embedded server 108 to provide necessary licenses and entitlements to the NEs. The embedded client 110 may be a portion of software or code operating on its associated NE. Each respective NE communicates through the embedded client 110 with the license embedded server 108 to request necessary licenses and entitlements from the license embedded server 108. In an example, the NE, communications switch 122, needs to begin communicating over an optical fiber with a remote switch, in addition to current communication over copper wire cabling. This additional capability requires activation of optical processing circuitry and connectors of the communications switch 122 which were heretofore unused by the communications switch 122. The communications switch 122, through the embedded client 110, communicates with the license embedded server 108 to request the licenses or entitlements necessary to activate the necessary features and functionality. The license embedded server 108 returns the necessary entitlements obtained by the customer. If the necessary entitlements are not available at the license embedded server 108, personnel of the customer 104 must contact the sales personnel of the vendor 102 to obtain additional entitlements. The updated entitlements are transferred to or made accessible by the vendor 102 to the licensor-customer portal 116 where it may be accessed by the customer 104.

Each customer will arrange the customer network according to customer needs. However, in many cases, the license embedded server 108 will be maintained together with the NEs such as the communications switch 122 in a highly secure environment. The highly secure environment may include a very strict firewall or even an airgap separating the license server and NE devices from other connections.

Figure 2:
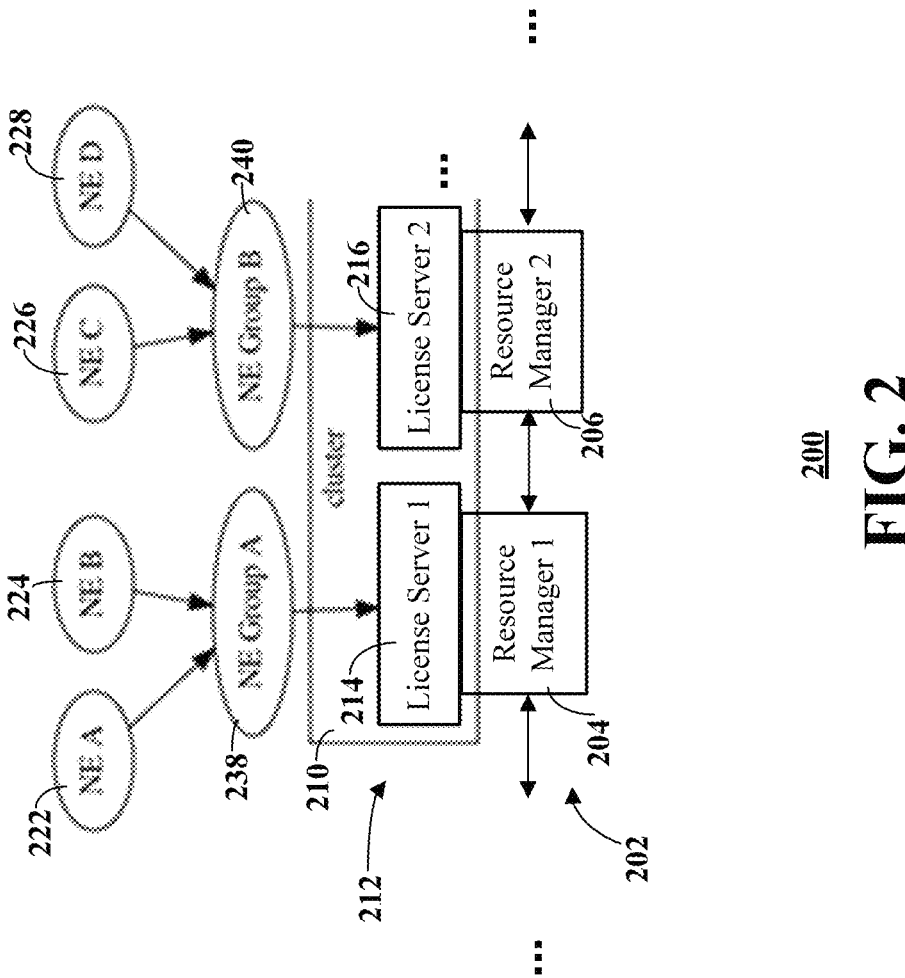
FIG. 2 depicts an illustrative embodiment of a licensing distribution system in accordance with various aspects described herein.

FIG. 2 depicts an illustrative embodiment of a licensing distribution system 200 in accordance with various aspects described herein. The licensing distribution system 200 may operate to provide license entitlements to customer equipment such as the MCP NMS 120 and the communications switch 122 of FIG. 1. Some or all the components of the licensing distribution system 200 may be located on customer premises. In particular embodiments, some or all of the components of the licensing distribution system 200 are located in or part of the license embedded server 108 of FIG. 1. The customer, such as customer 104 in FIG. 1, employs the licensing distribution system 200 to acquire and distribute required entitlements from a vendor, such as vendor 102 of FIG. 1. The licensing distribution system 200 may operate to implement a framework supporting multiple active license servers, each of which is active and performing a portion of the overall licensing load.

In the exemplary embodiment of FIG. 2, the licensing distribution system 200 includes a plurality of resource managers 202 including resource manager 204 and resource manager 206. Each respective resource manager of the plurality of resource managers 202 is associated with a respective license server of a plurality of license servers 212, including first license server 214 and second license server 216. The exemplary embodiment of FIG. 2 includes two resource managers 202 and two license servers 212. In various embodiments, a licensing distribution system 200 may include any suitable number of resource managers 202 and license servers 212. Generally, the plurality of resource managers 202 are networked together, for example on a token ring or other network. Each respective license server is paired with a respective, hardened resource manager.

In the embodiment of FIG. 2, the license server 214 and the second license server 216, with their respective resource managers including resource manager 204 and resource manager 206, are arranged in a cluster 210. The cluster 210 may be expanded or contracted as needed to include more or fewer license servers, depending on requirements. In some examples, a cluster such as cluster 210 has a single license server. As network demand for license entitlements increases, such as when the number of network entities increases, a new license server may be instantiated. This may be done, for example, by manual or automated operation of a resource manager to add a license server, along with its associated resource manager. Clusters such as the cluster 210 may include any suitable number of license servers. The license servers of a cluster can be and are treated as a single entity. Arranging one or more license servers as a cluster enables the expansion of a single license server into a plurality of license servers, i.e., those in the cluster. This is an add-on capability that can scale network incognizant services securely. The licensing software may not support scaling but, through use of a cluster of license servers, a new service and a new set of capabilities are provided that enable the customer to implement a secure framework on top of an existing license service. The new service can support scaling and lets the customer manage and scale it as needed.

Further, each resource manager and each license server may include any suitable combination of hardware and software. Hardware and software may be combined as required to form a first module which performs the functions described herein for the resource manager and to form a second module which performs the functions described herein for the license server. Further, in general, the module forming the license server provides the function of distributing license entitlements to network elements that require the license elements. The module forming the resource manager generally control the operation of the license server and cooperate with other resource managers to control the licensing distribution system 200.

Further, the embodiment of FIG. 2 includes a plurality of network elements that require entitlements or licenses for operation. In the example, the licensing distribution system 200 provides entitlements to network elements (NE or NEs) including network element 222, network clement 224, network element 226, and network element 228. Like the resource managers and the license servers, the number of network elements may include any number of network elements. Each network element is associated with an embedded client such as embedded client 110 of FIG. 1. In accordance with features described herein, licenses or entitlements required by the network elements are distributed to them over the network including a resource manager and a license server.

In some embodiments, two or more network elements may be grouped as a network element group such as first NE group 238, second NE group 240, third NE group 242, and fourth NE group 244. In the example, each NE group is shown as including two NEs. However, this is exemplary only. An NE group may include any convenient number of NE devices grouped together for functional or organizational purposes.

Respective components of the licensing distribution system 200 may be interconnected for data communication in any suitable fashion. In some embodiments, interconnections use very high data rate optical connections, such as a 10 G optical connection capable of communicating 10 gigabits per second (Gbps). Any suitable wireline, wireless and optical connection arrangement or communication media may be used and combined to enable communication among the licensing distribution system 200. Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

The resource managers 202 and the license servers 212 may include any suitable data processing apparatus or computing environment including, for example, a processor and a memory, along with a communication interface. In some embodiments, respective license servers of the plurality of license servers 212 may be substantially identical, or function substantially identically. Computing devices such as the license servers including the associated resource managers typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

A single standalone license server may be reused in scalable clusters such as the cluster 210. Such an arrangement provides many advantages. For example, the licensing distribution system 200 may be readily scaled by adding additional clusters to serve additional network elements or by adding additional license servers to increase the size and capacity of a respective cluster. Further, within a cluster, the functionality of any one license server may be rearranged or redistributed among other license servers, for example if a particular license server is taken offline for a time. Further, the arrangement of the licensing distribution system 200 of FIG. 2 allows geographic redundancy for providing licenses and entitlements to network elements. For example, a license cluster may have servers distributed across regional boundaries such as the east and west coast. The clustering design enables ready geographic expansion and subdivision as the licensing distribution system 200 requires.

Figure 3:
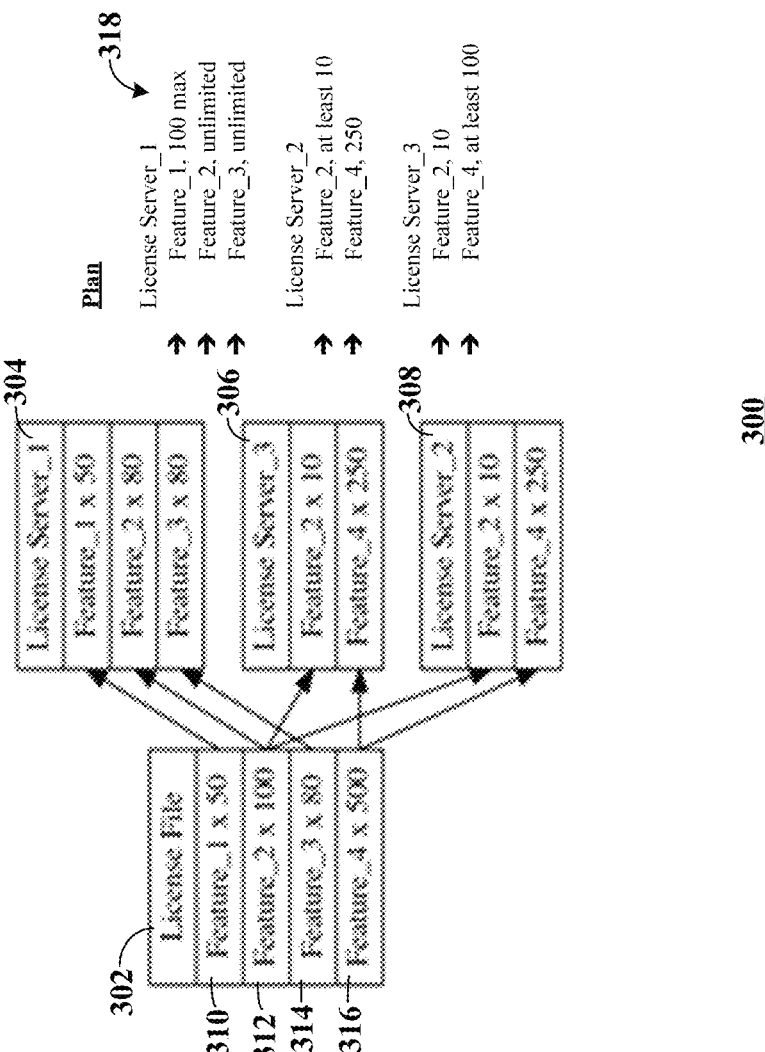
FIG. 3 depicts an illustrative embodiment of an architecture file for controlling assignment and distribution of licenses or entitlements in the licensing distribution system of FIG. 2 in accordance with various aspects described herein.

Similarly, licenses can be dynamically shared among license servers in the cluster. FIG. 3 illustrates an example of a license distribution plan or deployment plan in which licenses may be allocated according to customer requirements. As one cluster or group of NEs or NE require additional entitlements for operation or modification of operating parameters, a license may be reassigned from a license server where the license is unused to a license server where it is required. This can be accomplished in near real time, usually within a few milliseconds.

Further, the cluster arrangement of the exemplary enables the system to operate with minimal user interaction. Where user interaction is required, the user generally only needs to interact with a cluster such as cluster 210 as a single entity. User commands and modifications may be distributed to individual license servers within the cluster, for example by peer-to-peer communication among the resource managers.

In an example, a licensing service which was not capable of geographical redundancy or load sharing by itself can be added to a cluster of license servers. Then the whole cluster may be managed as one entity using unique certificates and a combination of allow lists and deny lists for resource allocation and entitlement control. An operator or a process need only interact with the cluster to control all license servers within the cluster. Furthermore, this can be achieved in an airgap or isolated network because all the necessary configuration information is contained within the cluster. Such isolation or airgapping enhances device and network security by limiting attacks or access by unauthorized parties. Without this solution, meticulous control, planning, and oversite may be required for each server every time a licensing or network configuration change is required.

In example embodiments, each resource managers of the resource managers 202 is coresident with an associated license server of the license servers 212 in a token ring or other network configuration. Each respective resource manager manages each respective license server's configuration files to securely allocate clients associated with the NEs and licensing (resources) for each respective license server. The maintenance of the configuration files may be secured from tampering with digital certificates and the resource managers 202 may actively manage the protected configuration of each license server in real time.

With respect to the relationship between a network element and a license server, a resource manager of the plurality of resource managers 202 may operate to allocate NEs to different license servers of the plurality of license servers 212. The license server to which an NE is allocated should have sufficient feature counts or entitlements to achieve a scaled solution. In this manner, as the customer's network grows, the license requests of the allocated NEs are distributed or allocated among license servers of the plurality 212 of license servers. With this improvement, the total number of NEs supported by a cluster such as the cluster 210 can exceed the maximum performance of any individual license server. This solution can also be used to scale or geographically distribute smaller performance servers together to meet growing network requirements instead of having to replace small servers or virtual machines (VMs) with much larger servers.

With respect to license feature management, the licensing distribution system 200 of FIG. 2 in some embodiments may provide to the customer a real time interface for managing licenses. In an example, customer personnel may use a processing device such as a laptop or desktop computer to access a processing system of one resource manager of the plurality 202 of resource managers. This may be done, for example, by network access over any suitable network such as the customer's private network or the public internet.

The customer personnel may, for example, access a user interface or dashboard provided by a resource manager. The user may provide login credentials through the user interface and, using the user interface or dashboard, the user can update or change a deployment plan or upload a new set of licenses to the entire cluster of license servers. The customer user may simply submit the changes to any one resource manager of the plurality 202 of resource managers. The selected resource manager may distribute all specified changes to the other resource managers of the plurality 202 of resource managers.

In an example embodiment, each respective resource manager may administer its own respective feature counts (maximums/remaining) based on license availability and the customer's distribution plan. Management of feature counts in this manner may prevent the unintended duplication of feature counts on multiple servers and provide a single administrative interface for the customer to customize the license distribution in the customer's network.

Further, the resource manager may distribute the counted entitlements as required based on factors such as the customer's deployment plan, NE location and predefined maximum server counts. The deployment plan developed and specified by the customer can simply define where entitlements need to go with some simple logic using counts, minimums, maximums and unlimited identifiers. FIG. 3 illustrates an example deployment plan. Each resource manager will deploy licenses according to some predefined logic, the customer's deployment plan and scale accordingly. In an example, embodiment, all counts are assigned by server precedence, first specific counts, then min/max and the rest split evenly between the remaining unlimited. This is discussed in more detail in connection with FIG. 3.

FIG. 3 depicts an illustrative embodiment of how license data from a license file 300 containing the deployment plan for the entitlements in the licensing distribution system 200 of FIG. 2 in accordance with various aspects described herein. The secured configuration file 300 includes a license file 302 defining feature availability for the cluster of license servers. The license servers may be similar to the plurality 212 of license servers of FIG. 2. In the example, the license file 302 stores feature definition data for a first license server 304, a second license server 306 and a third license server 308.

In accordance with various aspects described herein, the customer provides a network architecture file or license file 302. The license file 302 defines the entitlements and their associated attributes to be made available to the cluster, including in the illustrated example, the first license server 304, the second license server 306 and the third license server 308. In the example, the license file 302 specifies four features and the number of licenses or entitlements available for each respective feature. Thus, a license has a feature designated Feature_1, which has 50 entitlements available for all network elements of the customer. Feature_2 has 100 entitlements available for all network elements. Feature_3 has 80 entitlements available for all network elements. And a feature designated Feature_4 has 500 entitlements available for all network elements.

Each license server in the network, including the first license server 304, the second license server 306 and the third license server 308, has a complete copy of the license file 302. A resource manager is associated with each license server. The resource manager operates to install the license file 302 on any of the license servers. At the same time, the resource manager will also distribute or share the license file 302 to all other resource managers and license servers as well. All resource managers in the cluster have access to identical copies of the license file 302. Further, the license servers or resources managers may periodically, such as once per hour, operate to confirm that all license servers are currently using the same license file 302.

In the illustrated example, each feature corresponds to a functional or operational aspect of equipment of a vendor selected and paid for by the customer from the vendor. However, in other examples where licenses or entitlements or permissions or other features are distributed from a source to a user or destination, the same principles may apply for a license file 302 that specifies aspects to be distributed.

The contents of the license file 302 are based on the account of the customer with the vendor. The account specifies a number of licenses and types of each license paid for or assigned to the customer. In typical embodiments, the license file 300 contains hundreds of entries. Some customers have several thousand entries in their license files.

Further, the example of FIG. 3 illustrates one moment in time, when the customer has acquired the indicated number of licenses for the indicated features. In some examples, the customer may acquire more licenses for the four features illustrated, or may acquire more licenses for additional features, or may surrender some licenses for some features.

FIG. 3 further illustrates how the licensed features are distributed or allocated among the three license servers in this example. The first license server 304 has 50 licenses available for Feature_1, 80 licenses available for Feature_2, 80 licenses available for Feature_3 Similarly, the second license server 306 has 10 licenses available for Feature_2, and 250 licenses available for Feature_4. Finally, the third license server 308 has 10 licenses available for Feature_2 and 250 licenses available for Feature_4.

The number of features available on a license server represent the total number of licenses available. As the system operates and licenses are claimed and distributed to various network elements, the number of licenses actually available will be reduced. In some cases, if all assigned licenses are distributed to network elements, a particular license server may have no more licenses available to distribute to network elements that may need a license.

FIG. 3 further illustrates a customer license assignment plan or plan 318 that indicates the number of licenses for each feature that the customer has assigned to each license server. The customer license assignment plan 318 the customer to easily define how the customer wants licenses arranged in the customer's network plan. The customer license assignment plan 318 in some respects controls the operation of the resource managers that are associated with each license server as shown in FIG. 2.

The license file 302 along with the first license server 304, the second license server 306 and the third license server 308 are a visual representation of the content of the plan 318. The first license server 304, the second license server 306 and the third license server 308 are different instantiations of a license server. Together, they form a distributed version of the license embedded server 108 of FIG. 1. In a conventional arrangement, the licenses for features such as Feature_1, Feature_2, Feature_3, Feature_4, and so on are contained in a license file that only goes to the single license file server, license embedded server 108 of FIG. 1. In accordance with various aspects described herein, embodiments securely split the entitlements contained within the license file, such as license file 302, among multiple license servers. In the illustrated example, that includes the first license server 304, the second license server 306 and the third license server 308. The plan 318 defines distribution or allocation of the quantity of licenses specified by the license file 302. If there are 50 total entitlements for Feature_1 available, the plan 318 defines how those 50 entitlements are distributed or allocated among the license servers.

In example embodiments, the plan 318 may be created manually by customer personnel. For example, a resource manager associated with a license server may include an application programming interface (API) to receive commands from a data processing system such as a laptop computer. The API may receive commands specifying how features of the licensing plan should be allocated. A command may specify "add feature" to the plan and define the feature, as well as the number of the license entitlements to be supplied, the particular license servers the feature should be assigned to as well as the logical rules that control assignment of the feature. In another example, the customer may view a graphical interface through a network management service (such as one of the resource managers 202 of FIG. 2, for example). In this example, the customer personnel may drag and drop features on the graphical interface to create the plan 318. In yet another example, a load balancer associated with a resource manager operates to generate the plan 318 for the customer. With a load balancer, it can create the plan and make changes as required to redistribute features and counts as needed for each license server.

In the example of FIG. 3, in the plan 318 the customer may assign entitlements using definitional terms. One example of a definitional term is "100 max," or a maximum of 100 entitlements for Feature_1 assigned to the first license server 304. A second example of a definitional term is "unlimited," or an unlimited number of entitlements for Feature_2 and Feature_3 assigned to the first license server 304. Other examples of definitional terms include "at least 10" for the number of entitlements for Feature_2 assigned to the second license server 306 or the number of entitlements for Feature_4 assigned to the third license server 308. Other examples of definitional terms include an integer number corresponding to a definite number of entitlements assigned by the license file 302, such as 250 entitlements for Feature_4 assigned to the second license server 306 and 10 entitlements for Feature_2 assigned to the third license 308. Any suitable expression may be used by the customer to assign fixed or variable numbers of entitlements to the license servers, including algebraic expressions such as "A-B" entitlements, where A and B are known from another source in the licenses file 302.

The resource manager associated with each license server, including the first license server 304, the second license server 306 and the third license server 308, operates to allocate the specified number of entitlements for each feature to the license server. Further, the allocation is done dynamically. For example, if the third license server 308 fails and the first license server 304 is assigned as its backup, the resource managers associated with the license server will reallocate the entitlements of the third license server 308 to the first license server 304. Further, the customer license assignment plan 318 may also control assignment and reassignment of entitlements among the license servers.

In the example of FIG. 3, the license file 302 corresponds to what the customer has paid for and forms a ceiling for the number of licenses for all features that can be distributed. For example, the customer has paid for 100 entitlements for Feature_2. With three servers to distribute the 100 entitlements, 100 entitlements cannot be put on each server because that exceeds the number the customer is entitled to. The allocation of entitlements is controlled by the customer license assignment plan 318. By use of the customer license assignment plan 318, the customer can predefine a plan to specify how to allocate those licenses. For example, in the customer license assignment plan 318 specifies one hundred maximum entitlements for Feature_1, although Feature_1 only has a total of 50 available. However, if the customer had 500 entitlements available, the customer license assignment plan 318 controls the resource manager to put one hundred entitlements on the first license server 304 and then it would make the rest of them evenly split among the remaining license servers, second license server 306 and third license server 308.

In operation, the license deployment plan 318 is prepared by the customer personnel and distributed to the resource managers associated with the first license server 304, the second license server 306 and the third license server 308. The deployment plan 318 is used to distribute or allocate individual entitlements to the individual license servers, the first license server 304, the second license server 306 and the third license server 308. Information about that distribution is also distributed to all of the resource managers, as well as the original license file 302.

Periodically, such as every 5 minutes, all resource managers recalculate their respective needs. In embodiments, the first license server 304 is given a priority. Initially, the first license server 304 is queried for stipulated quantities according to the deployment plan 318, referring to strictly required quantities. In the illustrated example, the first license server 304 does not have stipulated quantities. Next, the second license server 306 is queried about stipulated quantities; it has Feature_4, 250 entitlements and at least 10 of Feature_2. Thus, on a first pass, the second license server 306 is assigned 10 entitlements for Feature_2 and 250 entitlements for Feature_4, if there are currently that many available on the license file 302. Finally in this example, the third license server 308 is considered. The third license server 308 is designated in the plan 318 for 10 entitlements for Feature_2. For Feature_4, the third license server 308 is designated for "at least 100" entitlements. Therefore, 100 entitlements for Feature_4 are distributed to third license server 308.

Allocation according to the plan 318 then returns to the first license server 304. All remaining entitlements from the license file 302 are then distributed to first license server 304. As indicated, this distribution is updated periodically at customer selectable periods from 1 minute to 30 minutes. A longer period may be chosen to reduce or limit network traffic among the network elements and the resource managers.

In general, each license server has no awareness of the other license servers or of the cluster 210. Each license server is given by the resource manager a list of licenses that have been distributed or allocated to the license server according to the deployment plan 318. In a conventional license distribution system, a license file is passed to the license server. In the illustrated embodiments, a new license file is created for each license server and passed to the resource manager to, in turn, pass to the license server.

In an example, a customer has several locations including a relatively small, remote location. The remote location has a small need for only a few licenses. The customer knows exactly what that location needs in terms of licenses or entitlements. Requirements for that remote location are not going to change substantially over time. The customer puts information about those requirements into the customer license assignment plan 318. In that way, the remote location will never be given licenses that it doesn't need. Remaining entitlements will be shared among other high-performance sites of the customer that have a more dynamic requirement for entitlements. However, the license server associated with the remote location can still be part of the same cluster as the license servers associated with the busier sites. In that way, the customer personnel only has to establish one license file with the vendor. The customer only has to maintain a single plan for the whole account, simplifying the process for the customer. The deployment plan may be updated as required by the customer.

In embodiments, the customer license assignment plan 318 can be future facing and adaptable to future needs and requirements of the customer. The customer can design the customer license assignment plan 318 for current network requirements. In addition, the customer can plan that, as network elements are added or changed in the future, the license assignments can be deployed to the new network elements. Such provisions for the future are conveyed by definitions such as "Feature_2, unlimited" and "Feature_2, at least 10." The customer can design the customer license assignment plan 318 initially and may not need to modify it. The customer license assignment plan 318 can in effect maintain itself. When the customer runs out of entitlements in the network and needs more in this set of network elements, because of this arrangement of customer rules, the customer can buy more licenses from the vendor. When the customer applies the new licenses to the cluster, the licenses distribute throughout the cluster according to the rules. As services need the licenses, they can add them from the license servers.

To set up the license distribution system, the customer installs a first license server. If the customer has a substantial network already, with many network elements or network elements at multiple geographic locations, the customer my initially set up two, three or more license servers. Each server is an autonomous entity. In embodiments, the control software for the license server or the resource manager includes a command to add a server to form a new cluster. Then, any server inside the already authenticated cluster could then add another server into the cluster. As the existing server in the cluster adds an external server, any of the existing server's previous architecture including previously defined entitlements, are eliminated and the existing server reset as part of the internal cluster. New entitlements are defined for the existing server and the added server based on the customer license assignment plan 318.

In an example, a cluster is arranged like the cluster 210 of license servers in FIG. 2. The cluster 210 has a first license server 214 and a second license server 216. In this example, the network elements are operating and the second license server 216 is receiving many license requests, to the point where the second license server 216 is becoming resource constricted. The customer chooses to relieve the load and to add a new license server, designated as a third license server, not shown in FIG. 2. The third license server appears as part of a group or cluster 210 of license servers. Initially, the third license server is visible through listing commands and the customer can see how the third license server is being used. However, initially the third license server initially has only default rules that say it is allowed to share anything that shareable. In effect, the initial rule is unlimited sharing of licenses. The customer could add the third license server and then point selected network elements at that third license server. The selected network elements can begin to get licenses.

Any suitable threshold or standard may be selected for adding a server to a network. Any suitable server performance metric may be used and, for example, compared with a threshold. If the threshold is exceeded, a decision may be made to add an addition license server. In one scenario, when traffic levels of communication network of customer exceed a predetermined threshold, such as fifty percent of network capacity, a second server is added to the network. In another scenario, an existing license server is exhibiting slower response times because of the volume of messages it is processing, either on a given day or during peak periods. When the response time of the license server exceeds a predetermined threshold, such as 500 ms, a second server may be added to the network. In yet another scenario, when traffic spikes during peak periods approach a predetermined traffic threshold, such as 100 license transactions per second, a second server may be added to the network. Such scenarios may justify adding another license server either temporarily or permanently.

In some embodiments, the additional license server may be added to the network. In an example, a network management service such as may monitor key performance indicators for the licensing distribution system. Such key performance indicators may include network capacity, server response times and traffic levels as indicated. When one or more predetermined thresholds is exceeded, the network management service may initiate a server addition process. For example, a virtual machine may be spun up on an available data processing system. The virtual machine may be provisioned and an additional license server in the network. Information about the current network may be provided to the additional license server, such as the current deployment plan and the current license distribution among existing servers. Other existing license servers may be informed through their respective resource managers about the additional license server. The additional license server may be placed into service by the network management service and network elements begin looking to the additional license server for licenses.

Traffic between resource managers may be relatively limited in volume. Such traffic generally includes any updates to the architecture such as modifications to the license file 302 which includes for example the feature count, license entitlement information, and information about the inventory of license servers including their certificates. Such data may amount to 4 KB of data in a typical application.

In some embodiments, the process of adding a license server is done manually by customer personnel. The customer personnel may access an API to control the instantiation of an additional license server. Adding the additional license server may be done in response to any condition in the network, such as detecting high traffic levels or slow response times.

In some embodiments, adding a license server or subtracting a license server may be predictive or based on learned information or external information. In an example, a resource manager 202 may include a machine learning (ML) model or artificial intelligence module with awareness of external information that may affect demand for licenses. For example, if the ML model has information that the customer will be installing a large number of network entities in the near future, the ML model may preemptively add one or more additional license servers in anticipation of the coming demand for licenses to be distributed to the new equipment.

In this manner, the customer can grow the customer's license distribution system. In this manner, the customer can achieve scaling of network distribution. Further, the customer can add or increase geographic distribution because the customer can set the servers up in different locations. The licensing distribution system 200 of FIG. 2 under control of the plan 318 in effect takes multiple network incognizant license servers and converts them into a single service for the purpose of scaling and redundancy. The licensing distribution system 200 is able to take a single license server which is associated to a single license file and extend the license file to multiple license servers. Conventionally, a customer cannot use license entitlements from a license file on more than one license server according to vendor terms of service that prevent unauthorized copying of the entitlements. The licensing distribution system 200 adds in custom libraries and changes the behavior from the conventional so that the customer can actually turn the licensing distribution system 200 into a cluster of multiple license servers.

Conventionally, any single license server may not be able to supply all licenses requested by a large network of network elements. The demand may exceed communication and processing bandwidth. However, by creating multiple instances of the license server such as the first license server 304, the second license server 306 and the third license server 308 illustrated in FIG. 3, under control of the plan 318, the licensing distribution system becomes scalable to meet licensing demand requirements. Redundancy is provided by designating, for each network element, a primary license server and a secondary license server.

The resource managers associated with the license servers communicate together in a token ring network. Each resource manager shares the deployment plan 318 and is a recipient of the deployment plan 318. A resource manager receives the deployment plan 318 and shares the deployment plan 318 with all other resource managers. Each resource manager also distributes the actual licenses that have been deployed. Every resource manager knows what every other resource manager is doing. The resource manager communicates with the network elements to provide information about how many licenses are available, expiration dates of licenses. The license server merely provides the actual license to the network element upon request. If the license server denies the request, the network element turns to the resource manager for further information.

The resource managers can operate together to handle a fault in which a license server is no longer available, due to a failure for example. If one license server disappears or becomes non-functional, the other license servers, under control of resource managers, distribute the remaining entitlements. This applies in particular to entitlements that are distributed as "100 maximum" or an "unlimited" number of entitlements for a feature to the first license server 304. In the case of an actual number of entitlements allocated to a license server, such as 250 entitlements for Feature_4 allocated the second license server 306, the load balancing function can call an API. In response to a license server no longer being available, an additional license server may be instantiated or created and all assignments of licenses from the failed license server are moved to the newly instantiated license server. The process of instantiation and moving or copying allocated license information is done by a resource manager of the cluster.

The resource manager maintains a whitelist-blacklist. The whitelist-blacklist is different from the customer license assignment plan 318 that indicates the number of licenses for each feature that the customer has assigned to each license server. The whitelist-blacklist is common across all of the license servers of the cluster. The whitelist-blacklist has an interpretation of the contents of the customer license assignment plan 318. The whitelist-blacklist defines rules and roles in the distribution of license and defines what each license server is authorized to do, under control of the resource manager. The whitelist-blacklist defines rules and roles by interpreting the customer license assignment plan 318. Anytime a change in the plan occurs, the resource manager interprets the changes in those plans and then reassigns its own distribution of licenses by modifying or updating the whitelist-blacklist.

Figure 4:
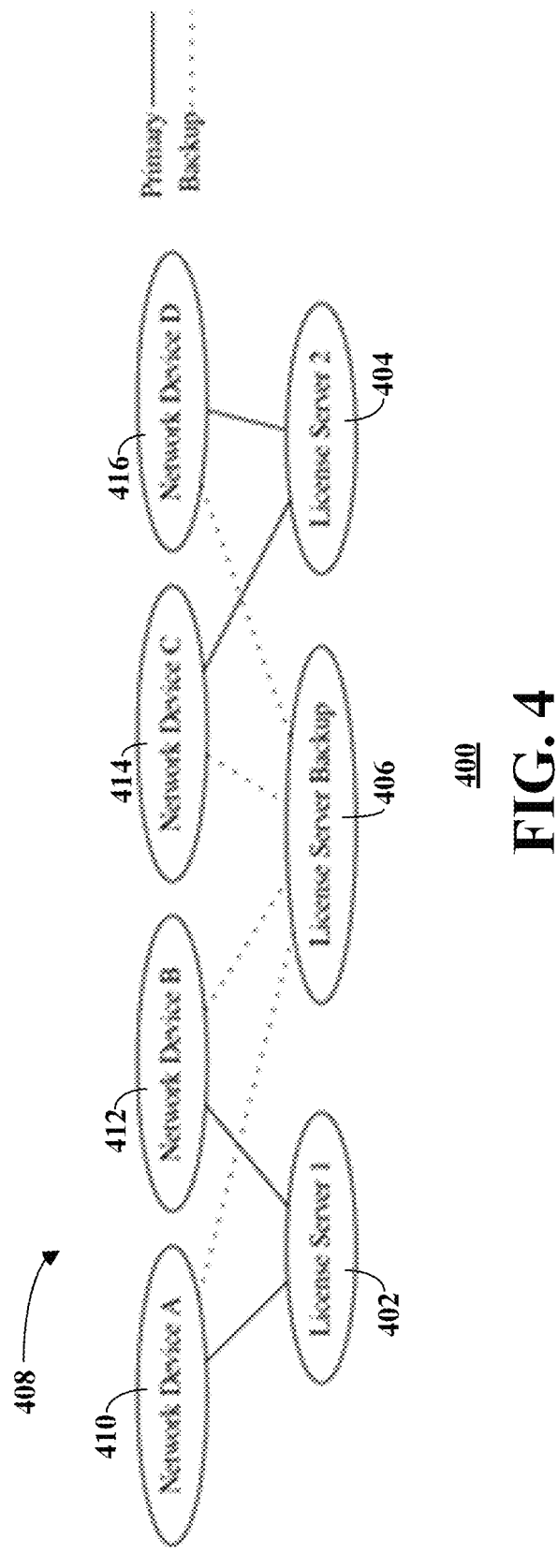
FIG. 4 depicts an illustrative embodiment of an improved backup configuration for a licensing distribution system in accordance with various aspects described herein.

FIG. 4 depicts an illustrative embodiment of an improved backup configuration 400 for a licensing distribution system such as the licensing distribution system 200 of FIG. 2, in accordance with various aspects described herein. The improved backup configuration in the illustrated embodiment includes a first license server 402, a second license server 404, a backup license server 406, and a plurality 408 of network elements. The plurality 408 of network elements includes in this example a network device 410, a network device 412, a network device 414, and a network device 416. Other embodiments will include alternative numbers of license servers and alternative numbers of network devices, as well as alternative configurations. In general, the improved backup configuration 400 operates according to the same principles as the licensing distribution system 200 of FIG. 2.

The improved backup configuration 400 illustrates implementation of a High Availability standby operation for the licensing distribution system 200. For High Availability (HA), improved backup configuration 400 migrates from the old active/standby model illustrated to an active/active standby model. Provided there are sufficient entitlements, the network elements can move their requests to another active license server. The improved backup configuration 400 also provides for a new many-to-one solution for hardware or disaster recovery. The old solution required one-for-one duplication, where every license server requires its own separate standby server.

The new solution, illustrated by improved backup configuration 400 of FIG. 4, allows one or more servers to share a backup server. Thus, in FIG. 4, the first server 402 and the second server 404 share the backup server 406. The relation of each license server, including license server 402 and license server 404, to one or more network elements as a primary server is indicated by solid lines in FIG. 4. Similarly, the relation of the backup license server 406 as a backup for each of the network elements is illustrated by dashed lines in FIG. 4.

Thus, if the network size (number of network elements) requires two license servers, only a single standby server needs to be added to the to the cluster to provide high availability backup. To achieve geographic redundancy, the designated backup license server may be in any remote network location. The resource manager moves the required licenses from a failed server to the new one. A shared virtual internet protocol (IP) device can be configured with the resource managers to provide a single IP address for primary and backup if required as well.

Thus, in accordance with some aspects described herein, embodiments provide for apparatus and method for a licensing distribution system. The licensing distribution system enables secure management and distribution of licenses or entitlements for use with vendor equipment by a customer on the customer's premises. License servers operate in conjunction with associated resource managers and according to a deployment plan. Within the customer's air-gapped network, each resource manager uses the entitlement information and the deployment plan to distribute the licenses to servers of a cluster of license servers which are incognizant of each other. The license servers of a cluster are treated as a single entity. The licenses are securely deployed without any user interaction required.

Further, a single deployment plan and a list of licenses are deployed to all resource managers and each resource manager coordinates with the resource managers to deploy its custom configuration. Licenses can be passed and shared between the independent license servers as required, under control of the resource managers.

Some aspects of the resource managers rely on unique features and aspects and provide substantial benefits. A first aspect is the ability to whitelist and blacklist items. This aspect includes not just individual nodes or network entities but also individual features. In an aspect, a single license server may be secured to make available (whitelisting) or deny (blacklisting) access to certain features or entitlements by node or network entity. For example, a particular license server may have ten nodes connected to the license server. In accordance with aspects, the license server may be defined to provide access to a feature for seven nodes and to deny access to the feature for three of the ten nodes. The feature may be any aspect of function or operation that may be the subject of a license or entitlement, such as an operational frequency band or activation of more than a single data port on a device such as a communication switch.

A second aspect is the designation of a unique identifier for each license server. This is used to resolve an issue of what to bind to when a unique identifier is needed for a system. The characteristics of a server may change with hardware, software upgrades or replacements. If those parameters change, so does the identifier which is based on those parameters. In embodiments, then, the identifier is based on attributes of the license server. Examples of the attributes include a media access control (MAC) layer address of the server, a network address, a universally unique identifier (UUID), a hard drive identifier, a central processing unit (CPU) identifier, a host identifier, a root certificate and a hardware key. These attributes are exemplary only; others may be used as well. This type of flexible node locking allows one or two parameters to change without changing the unique identifier.

The identifier operates to lock the node to the hardware. The unique identifier becomes part of a pool of identifiers that builds up a cloud identifier. So, when a license server is added to this design, the license server actually adds its unique identifier into the pool, and it is shared with all of the resource managers. The resource managers can then use the identifier to confirm that the license server is a valid member of the pool. In this manner, the pool of identifiers can be readily increased or decreased in size. When the pool shrinks, the identifiers are isolated out of the pool. Once the identifier is no longer a member of the pool, it no longer has entitlement to actions in the pool. In this manner, the pool of servers is maintained. All of the servers share the entitlement ring, and then the resource managers allocate from that resource pool a subset of licenses from the available licenses using the whitelist-blacklist definitions.

In a third aspect, customers provide a network architecture map or deployment plan of how the customer wants customer licenses deployed. The plan defines how the resource managers operate to assign licenses.

Embodiments enable active management of license features by the customer. The customer may be provided a real time interface or dashboard. Using the interface, customer personnel can update or change a license distribution plan or upload a new set of licenses from a license file to the entire cluster of license servers. The customer personnel may use the interface to submit the changes to the license distribution or deployment plan to any one resource manager. The license deployment plan is then distributed, with all changes, to the other resource managers. Each resource manager operates to administer its own feature counts (maximums/remaining) based on license availability and the customer's license deployment plan. This prevents the unintended duplication of feature counts on multiple servers and provides a single administrative interface for the customer personnel to customize the license distribution in the customer's network. The resource manager distributes the counted entitlements as required based on the customer's license distribution plan, network element location and predefined maximum server counts. In some embodiments, the license distribution plan can simply define where entitlements need to go with some simple logic using counts, minimums, maximums and unlimited identifiers. Each resource manager deploys licenses according to predefined logic and the customer's license distribution plan. This arrangement can scale accordingly. All counts of entitlements are assigned by server precedence, first according to specific counts, then minimum/maximum and the rest split evenly between the remaining unlimited assignments. Other assignment strategies may be used as well.

FIG. 5 depicts an illustrative embodiment of a method 500 in accordance with various aspects described herein. The method 500 may be used in conjunction with a licensing distribution system such as the licensing distribution system 200 of FIG. 2. The licensing distribution system may be used to distribute or deploy licenses or entitlements to equipment of a customer. The entitlements are required to enable functionality of aspects of the equipment of the customer provided by a vendor of the equipment. The entitlements are distributed by one or more license servers which operate in conjunction with associated resource managers. The method 500 may be performed by any suitable component of the licensing distribution system, such as one or more resource managers, license servers or the network management system, or a combination of these. The method 500 may be initiated by any suitable process such as, for example, receipt of a new or updated deployment plan, installation or activation of a new license server, etc.

At block 502, a resource manager receives a deployment plan. In embodiments, the deployment plan includes a customer license assignment plan that indicates the number of licenses for each feature that the customer has assigned to each license server in a license file. The license file is received from a vendor and defines the type and quantities of licenses or entitlements for which the customer has paid and establishes maximum numbers of entitlements that may be distributed. One example of a deployment plan is shown in FIG. 3. The deployment plan may be generated and provided to the resource manager in any suitable fashion. For example, the customer may develop a licensing strategy based on numbers of entitlements available, network elements in the customer's network, and other factors. Other factors may include provision for backup availability in case of device failure and routine outage such as device maintenance. Further a deployment plan may be updated by the customer based on a change such as acquisition of additional entitlements from the vendor or installation of additional license servers to distribute the entitlements to network elements, etc.

At block 504, in response to receiving the deployment plan at block 502, the resource manager immediately shares the deployment plan with other resource managers in the customer network. In embodiments, the resource managers and license servers are in data communication to share current information about operation of the network including sharing the current copy of the deployment plant. Further, the resource managers may communicate using a token ring network in which each resource manager-license server combination has an assigned priority. Communication ordering is according to the assigned priority.

At block 506, a network element requires a license entitlement. For example, the network element may be newly installed in the customer's network and require initial entitlements to begin functioning in the network. In another example, the network element may change its functionality or role in the network and require additional or updated entitlements. At block 506, the network element is assigned to a license server to acquire the necessary entitlements. The assignment to a particular license server may be based on information such as the deployment plan which identifies types of entitlements and numbers of entitlements assigned to each license server. The assignment to a particular license server may be based on a current supply or inventory of licenses available at various license servers. For example, a license server may have initially had a large supply of the required license but, after distributing its supply, have few or none available to distribute. In that case, the network element will be assigned to another license server to obtain the necessary entitlement. In still another example, a designated license server may be selected to provide entitlements to the network element in order to provide or enhance geographic redundancy (GR) in the network.

At block 508, license entitlements required by network elements including any newly added or reconfigured network elements are provided to the network elements from the license servers in the network. As entitlements are distributed, information about the license type and assigned network element is shared with other resource managers. In this manner, each resource manager has information about current supply of licenses at each license server.

At block 510, method 500 includes detection of a request for a license by a network element. The request may be received because a network element is newly added to the network, because the network or network element is reconfigured to different or additional functionality, or for any reason. If no request for a license is received, control returns to block 506 or any other step to continue processing license distribution for the network.

If a request for a license is received, at block 512, a license server distributes a license to the requesting network element. Further, at block 514, in response to the distribution of the license, the count of available licenses is adjusted at the license server. The resource manager associated with the license server distributes information about the adjusted count of available licenses to the other resource managers of the network.

At block 516, a network failure may be detected. The network failure may include a planned outage or unavailability of a license server, such as due to maintenance or system upgrade. Or a network failure may be due to unintended unavailability of network equipment such as one of the license servers. If no network failure or unavailability is detected, control returns to block 508 to continue providing license entitlements normally. The method 500 continues providing required licenses to network elements.

If a network failure or unavailability is detected, at block 518, network devices may be automatically re-directed to a second license server for operation as a backup license server. This failover operation may be defined by the license deployment plan. The deployment plan may include a specification of a primary license server from which each network element should obtain entitlements. The load on the network may be distributed among multiple license servers.

Further, the deployment plan may include a specification of a backup server from which each network element should obtain entitlements in the event the primary license server is unavailable. Still further, the license deployment plan should include a designation of enough licenses for specific features in order to supply both the network elements that use a license server as a primary license server as well as for network elements that use the same license server as a backup license server.

In some embodiments, if the failure detected at block 516 is so severe that the affected license server will be offline and unavailable for an extended time, a more permanent solution may be required. In an example, a new license deployment plan may be determined and provided to the resource managers. Control may resume then at block 502, for example. Otherwise, if the network failure is short-term only, control will return to block 508 or any other suitable point and the method 500 continues providing required licenses to network elements.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate one or more features described herein. The embodiments (e.g., in connection with identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifiers can be used to learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

receiving information about a pool of license entitlements for distribution to network elements of a number of network elements requesting license entitlements of the pool of license entitlements;

receiving a deployment plan for distributing license entitlements of the pool of license entitlements, wherein the deployment plan defines allocations of license entitlements of the pool of license entitlements, wherein the deployment plan is dynamically adaptable according to time-varying requirements from respective network elements of the number of network elements;

wherein the receiving the deployment plan comprises receiving the deployment plan at one resource manager of a plurality of resource managers, each resource manager of the plurality of resource managers being in data communication over a secure token ring network with other resource managers of the plurality of resource managers, wherein each resource manager of the plurality of resource managers is co-resident with a respective associated license server of a plurality of license servers forming a secured cluster of license servers, wherein the respective associated license servers of the secured cluster of license servers are controllable as a single entity according to the deployment plan, each respective resource manager being operative to manage a configuration of its respective associated license server according to the deployment plan, wherein the deployment plan includes predefined logic to manage license allocation, including minimum thresholds, maximum thresholds, and failover thresholds for license entitlements across the plurality of license servers, and wherein the deployment plan further includes redundancy requirements and dynamic logic for scaling a number of license servers actively involved in deploying license entitlements in response to the time-varying requirements from the respective network elements of the number of network elements, and responsive to receiving the deployment plan and responsive to contents of the deployment plan, the one resource manager communicating over the secure token ring network to distribute the deployment plan to the other resource managers of the plurality of resource managers among the secured cluster of license servers;

distributing license entitlements amongst a plurality of license servers of the secured cluster of license servers according to the deployment plan, wherein the distributing the license entitlements comprises assigning respective license entitlements of the license entitlements to a respective associated license server by a respective resource manager in response to the respective resource manager receiving the deployment plan from the one resource manager;

synchronizing the deployment plan with all resource managers in the secured cluster of license servers by communicating on the secure token ring network, wherein the synchronizing includes secure communication of encrypted configuration files and dynamic updates in response to changes in the deployment plan; and dynamically scaling a number of license servers of the plurality of license servers of the secured cluster by automatically instantiating or removing license servers in the secured cluster of license servers responsive to the time-varying requirements from the respective network elements of the number of network elements, wherein the scaling is responsive to a variation in demand for the license entitlements of the pool of license entitlements, wherein the scaling comprises managing the plurality of license servers of the secured cluster as a single entity including secure communication of an updated deployment plan for dynamically sharing the license entitlements of the pool of license entitlements among the plurality of license servers responsive to the variation in demand for the license entitlements, and wherein the scaling further comprises combining newly instantiated servers into the secured cluster of license servers with dynamic coordination by the resource managers of the plurality of resource managers.

2. The non-transitory machine-readable medium of claim 1, wherein the operations further comprise:

receiving the deployment plan over the secure token ring network at a license server of the plurality of license servers, each respective license server of the secured cluster of license servers including a respective resource manager module and a respective license server module; and sharing, by the respective resource manager module of the license server over the secure token ring network, the deployment plan to other resource manager modules of the secured cluster of license servers.

3. The non-transitory machine-readable medium of claim 2, wherein the sharing the deployment plan to the other resource manager modules comprises:

sharing the deployment plan to the other resource manager modules over the secure token ring network by the respective resource manager module automatically, in response to receiving the deployment plan at the respective resource manager module.

4. The non-transitory machine-readable medium of claim 1, wherein the receiving the deployment plan comprises:

receiving information defining a plurality of operational features, operational features of the plurality of operational features being enabled for use by respective network elements according to one or more license entitlements of the deployment plan; and receiving information defining a number of license entitlements for each operational feature of the plurality of operational features.

5. The non-transitory machine-readable medium of claim 4, wherein the receiving the deployment plan comprises:

receiving information defining numbers of license entitlements for each operational feature assigned to each respective license server of the plurality of license servers.

6. The non-transitory machine-readable medium of claim 1, wherein the scaling the number of license entitlements comprises:

adding one or more additional license servers to the secured cluster of license servers responsive to a determined requirement for additional capacity.

7. The non-transitory machine-readable medium of claim 6, wherein the operations further comprise:

sharing, by a license server of the plurality of license servers, with the one or more additional license servers, the deployment plan for distributing license entitlements of the pool of entitlements.

8. The non-transitory machine-readable medium of claim 1, wherein the operations further comprise:

instantiating a first license server, the first license server including a resource manager module and a license server module; and allocating license entitlements to network elements in a network by the first license server in response to license entitlements requests received from respective network elements.

9. The non-transitory machine-readable medium of claim 8, wherein the operations further comprise:

comparing a key performance indicator for the first license server with a performance threshold;

instantiating an additional license server responsive to the key performance indicator exceeding the performance threshold to scale the number of license servers according to a variation in the key performance indicator; and responsive to instantiating the additional license server, sharing information about the deployment plan and a current distribution for license entitlements to the additional license server.

10. The non-transitory machine-readable medium of claim 9, wherein the operations further comprise:

receiving an updated deployment plan for distributing the license entitlements of the pool of license entitlements to the plurality of license servers, the updated deployment plan including additional required entitlements; and sharing, by the respective resource manager module of the first license server, the updated deployment plan to other resource manager modules of the plurality of license servers.

11. A method, comprising:

receiving, by a processing system including a processor, information about a pool of license entitlements for deployment to network elements of a number of network elements requesting license entitlements of the pool of license entitlements;

receiving, by the processing system, a deployment plan
defining allocations of license entitlements of the pool
of license entitlements among license servers of a
cluster of license servers, the license servers of the
cluster of license servers being configured to deploy the
license entitlements of the pool of license entitlements
to network elements of the number of network ele-
ments, wherein the deployment plan is dynamically
adaptable according to time-varying requirements from
respective network elements of the number of network
elements, wherein the receiving the deployment plan
comprises:
  receiving the deployment plan at one resource manager
    of a plurality of resource managers, each resource
    manager of the plurality of resource managers being
    in data communication over a token ring network
    with other resource managers of the plurality of
    resource managers, each resource manager of the
    plurality of resource managers being co-resident
    with a respective associated license server of the
    cluster of license servers, wherein the respective
    associated license server of the cluster of license
    servers are controllable as a single entity according
    to the deployment plan, each respective resource
    manager being operative to manage a configuration
    of its respective associated license server, and
  responsive to receiving the deployment plan and
    responsive to contents of the deployment plan, com-
    municating the deployment plan by the one resource
    manager over the token ring network to distribute the
    deployment plan to the other resource managers of
    the plurality of resource managers;
distributing, by the processing system, license entitle-
  ments amongst a plurality of license servers of the
  cluster of license servers, wherein the distributing the
  license entitlements comprises assigning selected
  license entitlements to a respective associated license
  server by a respective resource manager in response to
  the respective resource manager receiving the deploy-
  ment plan from the one resource manager;
synchronizing, by the processing system, the deployment
  plan among all resource managers of the plurality of
  resource managers by communicating on the token ring
  network, wherein the synchronizing includes secure
  communication of encrypted configuration files and
  dynamic updates in response to changes in the deploy-
  ment plan; and
dynamically scaling, by the processing system, a number
  of license servers in the cluster of license servers by
  increasing or decreasing the number of license servers
  in the cluster of license servers, wherein the scaling the
  number of license servers in the cluster of license
  servers is responsive to the time-varying requirements
  from the respective network elements of the number of
  network elements, wherein the scaling comprises
  instantiating one or more additional license servers in
  the cluster of license servers responsive to an increase
  in the number of network elements requesting license
  entitlements and removing one or more excess license
  servers from the cluster of license servers responsive to
  a decrease in the number of network elements, and
  wherein the scaling further comprises combining newly
  instantiated servers into the cluster of license servers
  with dynamic coordination by the resource managers of
  the plurality of resource managers.
12. The method of claim 11, wherein the receiving a
deployment plan comprises:

30 receiving, by the processing system, information defining
  a plurality of operational features, operational features
  of the plurality of operational features being enabled
  for use by respective network elements according to
  one or more license entitlements of the deployment
  plan; and
receiving, by the processing system, information defining
  a number of license entitlements for each operational
  feature of the plurality of operational features.
13. The method of claim 12, wherein the receiving a
deployment plan comprises:
  receiving, by the processing system, information defining
    numbers of license entitlements for each operational
    feature assigned to each respective license server
    including a first license server of the plurality of license
    servers.
14. The method of claim 13, wherein the operations
further comprise:
  instantiating, by the processing system, an additional
    license server, the first license server and the additional
    license server being respective license servers of the
    cluster of license servers.
15. The method of claim 14, comprising:
  communicating, by the processing system, an updated
    deployment plan between the first license server and
    respective license servers of the cluster of license
    servers including the additional license server; and
  communicating, between the first license server and the
    respective license servers of the cluster of license
    servers including the additional license server, infor-
    mation about a current distribution for license entitle-
    ments.
16. A license server, comprising:
  a license server module;
  a resource manager module associated with the license
    server module for controlling operation of the license
    server module;
  a processing system including a processor; and
  a memory that stores executable instructions that, when
    executed by the processing system, facilitate perfor-
    mance of operations, the operations comprising:
  receiving, at the resource manager module, information
    about a pool of license entitlements for deployment to
    license servers of a cluster of license servers, the cluster
    including the license server, wherein license entitle-
    ments of the pool of license entitlements are distribut-
    able to network elements requiring license entitlements
    by the license servers of the cluster of license servers;
  receiving, at the resource manager module, a deployment
    plan defining allocations of license entitlements of the
    pool of license entitlements to the license servers of the
    cluster of license servers, wherein the deployment plan
    is dynamically adaptable according to time-varying
    requirements for license entitlements from respective
    network elements;
  deploying, by the resource manager module, license
    entitlements amongst the license servers of the cluster
    of license servers according to the deployment plan,
    wherein the deploying the license entitlements com-
    prises communicating the deployment plan over a
    common data network shared with other license servers
    of the cluster of license servers, each respective license
    server of the cluster of license servers including a
    respective license server module and a respective asso-
    ciated resource manager module, wherein the deploy-
    ing the license entitlements comprises assigning license
    entitlements of the pool of license entitlements to a respective license server module by its respective associated resource manager module;

modifying, by the resource manager module, deployment of the license entitlements amongst the license servers in response to a variation in a number of the network elements requiring the license entitlements, wherein the modifying the deployment of the license entitlements comprises initiating by the resource manager module an increase or a decrease in the number of license modules in the cluster of license modules in response to the variation in the number of the network elements requiring the license entitlements;

comparing, by the resource manager module, a key performance indicator for the license servers of the cluster of license servers with a performance threshold;

instantiating, by the resource manager module, an additional license server in the cluster of license servers responsive to the key performance indicator exceeding the performance threshold to thereby scale the number of license servers according to a variation in the key performance indicator; and responsive to instantiating the additional license server, sharing, by the resource manager module, information about the deployment plan and a current distribution for license entitlements to the additional license server, wherein the sharing the information about the deployment plan comprises communicating the deployment plan to a resource module of the additional license server.

17. The license server of claim 16, wherein the operations further comprise:

receiving the deployment plan at the license server at the resource manager module of the license server; and distributing, by the resource manager module of the license server, the deployment plan to other resource manager modules of license servers of the cluster of license servers.

18. The license server of claim 17, wherein the operations further comprise:

receiving an updated deployment plan for distributing the license entitlements; and sharing the updated deployment plan among respective license servers of the cluster of license servers.

19. The license server of claim 18, wherein the operations further comprise:

in response to a determination that a selected license server of the cluster of license servers is unavailable, automatically assigning a second license server of the cluster of license servers as a backup to the selected license server.

20. The license server of claim 16, wherein the operations further comprise:

instantiating an additional license server.

*    *    *    *    *